(12) United States Patent
von Pohle et al.

(10) Patent No.: US 10,280,008 B2
(45) Date of Patent: May 7, 2019

(54) APPARATUS FOR ADJUSTABLY POSITIONING AN OBJECT OF INTEREST

(71) Applicants: Austin von Pohle, Loma Linda, CA (US); Brian Howton, College Place, WA (US); Andy Wooley, Walla Walla, WA (US)

(72) Inventors: Austin von Pohle, Loma Linda, CA (US); Brian Howton, College Place, WA (US); Andy Wooley, Walla Walla, WA (US)

(73) Assignee: Key Technology, Inc., Walla Walla, WA (US)

( * ) Notice: Subject to any disclaimer, the term of this patent is extended or adjusted under 35 U.S.C. 154(b) by 0 days.

(21) Appl. No.: 15/459,868

(22) Filed: Mar. 15, 2017

(65) Prior Publication Data

US 2017/0183166 A1    Jun. 29, 2017

Related U.S. Application Data

(63) Continuation-in-part of application No. 14/848,717, filed on Sep. 9, 2015.

(51) Int. Cl.
  *B65G 43/02*    (2006.01)
  *B65G 15/00*    (2006.01)
  (Continued)

(52) U.S. Cl.
  CPC ............. *B65G 43/02* (2013.01); *B65G 23/44* (2013.01); *B65G 39/16* (2013.01); *B65G 2203/0283* (2013.01); *B65G 2203/042* (2013.01)

(58) Field of Classification Search
  CPC ............................ B65G 39/16; B65G 23/44; B65G 2203/0283; B65G 43/02; B65G 15/00;
  (Continued)

(56) References Cited

U.S. PATENT DOCUMENTS

| 5,518,457 A * | 5/1996 | Seki | ...................... B31F 1/2831 |
| | | | 474/102 |
| 2006/0289280 A1* | 12/2006 | Furuya | ............... G03G 15/1615 |
| | | | 198/806 |
| 2010/0294624 A1* | 11/2010 | Warner | .................. B65G 43/02 |
| | | | 198/502.2 |

FOREIGN PATENT DOCUMENTS

WO    WO2005109111 A1    11/2005

OTHER PUBLICATIONS

The International Search Report and the Written Opinion of the International Searching Authority, PCT/US16/41049, dated Nov. 29, 2016.

(Continued)

*Primary Examiner* — Mehrdad Dastouri
*Assistant Examiner* — Samuel D Fereja
(74) *Attorney, Agent, or Firm* — Randall Danskin P.S.

(57) ABSTRACT

An apparatus for adjustably positioning an object of interest is described, and which includes a wave propagator and a wave detector which are both mounted in spaced relation to an object of interest, and which allows determination of a distance between the wave propagator and wave detector and the object of interest during operation; an adjustment device mounted in force transmitting relation relative to the object of interest an which imparts force to the object of interest to maintain the object of interest along a predetermined course of travel, and a controller coupled in controlling relation relative to the wave propagator and the adjustment device, and in signal receiving relation relative to the wave detector.

4 Claims, 5 Drawing Sheets

(51) Int. Cl.
 *B65G 39/16* (2006.01)
 *B65G 23/44* (2006.01)
(58) Field of Classification Search
 CPC ............ B65G 15/64; B65G 2201/0285; B65G
 2203/042; B65G 2203/044; B65G 43/08;
 G03G 15/755; G03G 2215/00156; G03G
 15/2064; G03G 15/161; G03G 15/1615;
 G03G 15/167; G03G 15/6532; G03G
 15/6564; G03G 15/754; G03G
 2215/0016; G03G 2215/00168; G03G
 2215/00679; G03G 2215/1614; G03G
 2215/2016; G03G 2215/2032; H04N
 21/2541; H04N 21/41407; H04N
 21/4405; H04N 21/4627; H04N
 21/63345; H04N 21/643
 See application file for complete search history.

(56) References Cited

OTHER PUBLICATIONS

Notification of Transmittal of the International Search Report and the Written Opinion of the Internationalsearching Authority, or the Declaration, PCT/US18/14171, dated Apr. 4, 2018.
Notification of Transmittal of International Preliminary Report on Patentability, PCT/US16/41049, dated Sep. 7, 2017.

\* cited by examiner

APPARATUS FOR ADJUSTABLY POSITIONING AN OBJECT OF INTEREST

RELATED APPLICATIONS

This utility patent application is a Continuation-In-Part (CIP) Application of presently pending U.S. patent application Ser. No. 14/848,717 filed on Sep. 9, 2015. There is at least one common joint-inventor for this instant application and the aforementioned co-pending U.S. Ser. No. 14/848,717. The entire contents, and teachings, of earlier filed co-pending U.S. Ser. No. 14/848,717 are expressly incorporated herein by this reference.

TECHNICAL FIELD

The present invention relates to an apparatus for adjustably positioning an object of interest, and more specifically to a device which is peculiarly adapted to detect, measure and then adjustably maintain a continuous conveyor belt in a predetermined location as the conveyor belt rotates between, and about, a drive roller, and an idler roller, respectively.

BACKGROUND OF THE INVENTION

Continuous conveyor belts to transport products between work stations have been extensively used since the industrial revolution. The construction of these continuous conveyor belts is well known. In their simplest form, conventional conveyor belts include a drive roller which is coupled to some energizing force such as an electric motor, or the like, and which further rotates the drive roller in a given direction. Spaced a given distance from the drive roller is an idler roller. The continuous conveyor belt is tensioned between the drive roller, and the idler roller. Rotation of the drive roller imparts motion to the conveyor belt which then travels and moves about the idler roller and then returns to the drive roller. The upper facing surface or top flight of the conveyor belt generally supports a product or objects that need to be transported along the upper facing surface or top flight of the conveyor belt.

At relatively low operational speeds, the continuous conveyor belt typically rotates and stays oriented along a given path of travel between the drive roller, and idler roller during operation. However, as rotational speeds and conveyor belt speeds have increased, it has long been recognized that continuous conveyor belts can migrate, "creep" or otherwise move laterally or from side-to-side toward one peripheral edge and away from the opposing peripheral edge. This lateral or side-to-side movement increases the wear on the conveyor belt because of increased friction. Often this side-to-side migration or "creeping" is caused by numerous factors including bearing wear which causes the respective axles supporting the drive roller, and the idler roller, to become misaligned or otherwise located in a non-parallel relationship thus causing or encouraging the conveyor belt to migrate to one side or the other of the respective rollers. In other instances, the mere wear of the conveyor belt due to its continuous usage with a given product causes the conveyor belt to wear un-evenly and thus migration results. Still, in other instances, the high speed of rotation of the conveyor belt may cause the belt to unduly vibrate during operation. This vibration motion, again, encourages migration of the conveyor belt in one direction, or another. Yet further, and while the drive roller, and idler roller may be maintained in a substantially parallel relationship, a non-horizontal orientation of the conveyor assembly, as a whole, can encourage migration or "creeping" of the rotating conveyor belt in one direction or another. Yet further still, uneven loading of the conveyor belt, where more quantity, or weight, of product is placed on one portion of the belt offset from a centerline can cause the belt to migrate laterally toward one edge and away from the other.

Once this lateral or side-to-side motion of the conveyor belt is observed, adjustments can be made to either the drive roller or idler roller, or both, so as to encourage the continuous conveyor belt to move back to an appropriate orientation relative to the rollers and into a proper predetermined course of travel. Such an adjustment to the drive roller or idler roller, or both, is normally done by hand, and requires some degree of expertise, in order to effect the appropriate adjustment which is necessary to cause the continuous conveyor belt to move back to an appropriate orientation relative to the drive and idler rollers, respectively. For particularly long and continuous conveyor belts, this adjustment process may take some period of time, and may further, on occasion, cause the conveyor assembly to be taken out of service while the adjustments are being made. Obviously, the failure to make the appropriate adjustments to the drive or idler rollers may result in a premature wearing of the conveyor belt, or perhaps even a catastrophic failure of the conveyor belt and entire conveyor assembly, depending upon the type of conveyor belt being employed.

An optical sensor based system to monitor and automatically adjust the position of a continuously rotatable conveyor belt is described in co-pending U.S. application Ser. No. 14/848,717, filed on Sep. 9, 2015. The entire contents and teachings described in U.S. Ser. No. 14/848,717 are hereby expressly incorporated herein.

The optical sensor based system is founded on the physics of known distance, and a known speed of electromagnetic waves, both of which may be used to calculate a known time for the electromagnetic waves to travel the known distance using the formula $d=vt$ (where "d" represents distance; "v" represents velocity and "t" represents time). Optical sensor based systems have proven effective but are dependent upon contrasts in colors and are sensitive to debris and product splatter which are common in high-speed, high-volume, automated sorting applications. Shielding and screens, and the like have been employed to protect the sensors and to maintain contrasts, but even such shielding/screens can, over time, develop deposits of splatter, debris, dirt, water and the like which can negatively affect the accuracy of the optical systems by diminishing contrasts as well as partially or completely blocking transmission and receipt of the electromagnetic waves.

Use of waves to determine measurements and distances and to provide data for making adjustments remains a valuable tool. A "wave" is defined in the *McGraw-Hill Dictionary of Scientific and Technical Terms* (Fifth Ed., 1994). Wave: "a disturbance which propagates from one point in a medium to other points without giving the medium as a whole any permanent displacement." Further, the term "Wave Motion" is defined in the same text as: "The process by which a disturbance at one point is propagated to another point more remote from the source with no net transport of the material of the medium itself; examples include the motion of electromagnetic waves, soundwaves, hydrodynamic waves in liquids and vibration waves in solids".

It has been found by the inventors herein that mechanical waves provide an accurate means of measuring, tracking and providing data so as to facilitate adjustments to a continuously rotatable conveyor belt without the drawbacks inherent in optical sensor based systems that are reliant upon electromagnetic waves.

An apparatus for adjustably positioning an object of interest such as a rotating conveyor belt is the subject matter of the present Application.

SUMMARY OF THE INVENTION

A first aspect of the present invention relates to an apparatus for adjustably positioning an object of interest which, when rendered operational, is moveable along a predetermined course of travel and includes a wave propagator and a wave detector which are both mounted in spaced relation relative to the object of interest, and which in combination measure a feature of the object of interest, and wherein the wave detector generates a signal that correlates to the feature which is measured, and an adjustment device mounted in force transmitting relation relative to the object of interest, and wherein the adjustment device, when actuated, imparts force to the object of interest to maintain the object of interest along the predetermined course of travel, and a controller coupled in signal receiving relation relative to the wave detector, and which is further disposed in controlling relation relative to the adjustment device and the wave propagator, and wherein the controller selectively actuates the adjustment device based upon the received signal so as to maintain the movement of the object of interest along the predetermined course of travel.

A further aspect of the present invention relates to an apparatus wherein the object of interest comprises an elongated, continuous conveyor belt that has a longitudinal axis, top and bottom flights, a first peripheral edge and a second spaced apart peripheral edge and an exterior product carrying surface and an opposing interior facing surface with a cross-sectional thickness between the exterior product carrying surface and the opposing interior facing surface, and which is further tensioned between a drive roller and an idler roller, and wherein the drive roller and the idler roller each have a longitudinal axis which is oriented in substantially perpendicular orientation relative to the longitudinal axis of the continuous conveyor belt, and wherein the longitudinal axis of either the drive roller, or the idler roller, is selectively moveably adjustable relative to the longitudinal axis of the continuous conveyor belt so as to maintain the conveyor belt along the predetermined course of travel.

A further aspect of the present invention relates to an apparatus wherein the wave propagator emits waves directed at the cross sectional-thickness of the continuous conveyor belt and the wave detector detects waves reflected, at least in part, from the cross-sectional thickness of the continuous conveyor belt.

A further aspect of the present invention relates to an apparatus wherein the wave propagator emits mechanical waves directed at the cross sectional-thickness of the continuous conveyor belt and the wave detector detects mechanical waves reflected, at least in part, from the cross-sectional thickness of the continuous conveyor belt.

A further aspect of the present invention relates to an apparatus wherein the wave propagator emits electromagnetic waves directed at the cross sectional-thickness of the continuous conveyor belt and the wave detector detects electromagnetic waves reflected, at least in part, from the cross-sectional thickness of the continuous conveyor belt.

A further aspect of the present invention relates to an apparatus wherein the wave propagator emits sound waves directed at the cross sectional-thickness of the continuous conveyor belt and the wave detector detects sound waves reflected, at least in part, from the cross-sectional thickness of the continuous conveyor belt.

A further aspect of the present invention relates to an apparatus wherein the wave propagator emits waves in a manner where the waves are transmitted in a direction toward, and are reflected, at least in part from, the cross-sectional thickness of the first or second peripheral edge of the object of interest, and wherein at least some of the reflected waves are received by the wave detector and used to generate a signal that is communicated to the controller.

A further aspect of the present invention relates to an apparatus wherein the adjustment device comprises a linear actuator, which, when rendered operational, is continuously adjustable by the action of the controller so as to exert a variable amount of force on either the drive roller and/or the idler roller so as to change the relative position of the longitudinal axis thereof, and effect the movement of the continuous conveyor belt along the predetermined course of travel while maintaining an optimal tension on the continuous conveyor belt.

A further aspect of the present invention relates to an apparatus wherein the drive roller, and the idler roller each have opposite ends, and wherein the linear actuator is mounted in force transmitting relation relative to one end of either the drive roller and/or the idler roller.

A further aspect of the present invention relates to an apparatus further comprising a second linear actuator which is mounted on an opposite end of either the drive roller or the idler roller, and wherein the second linear actuator is operably coupled to the controller.

A further aspect of the present invention relates to an apparatus wherein the feature which is measured by the wave propagator and wave detector is the cross-sectional thickness of a peripheral edge of either or both of the top or the bottom flight of the continuous conveyor belt.

A further aspect of the present invention relates to an apparatus comprising a load cell which is coupled in force sensing relation relative to the linear actuator, and wherein the load cell is further coupled in signal transmitting relation relative to the controller, and wherein the signal which is supplied to the controller by the load cell indicates to the controller the amount of force being exerted by the linear actuator on the drive roller and/or the idler roll, and the conveyor belt.

A further aspect of the present invention relates to an apparatus wherein the waves are continuously generated when the elongated conveyor belt is in operation.

A further aspect of the present invention relates to an apparatus wherein the waves are periodically generated when the elongated conveyor belt is in operation.

A further aspect of the present invention relates to an apparatus for adjustably positioning an object of interest, comprising an elongated, continuously rotatable conveyor belt which has opposite first and second ends, a top flight for supporting a product, and an opposite bottom flight, and wherein the elongated, continuously rotatable conveyor belt has a peripheral edge having a cross-sectional thickness, and is further tensioned between a drive roller, and at least one idler roller, and further has a longitudinal axis which extends between the first and second ends thereof, and wherein the drive roller, and the at least one idler roller, each have a longitudinal axis which is located in a substantially transverse orientation relative to the longitudinal axis of the elongated, continuously rotatable conveyor belt; a wave propagator positioned a known distance from, and proximate to, the first and/or second peripheral edge of the top or bottom flight of the elongated, continuously rotatable conveyor belt which, when energized, propagates a wave which is directed towards the cross-sectional thickness of the proximate peripheral edge of the top or bottom flight of the elongated, continuously rotatable conveyor belt; a linear actuator mounted in force transmitting relation relative to the drive roller and/or idler roller, and wherein a force generated by the linear actuator on either of the drive roller and/or idler roller changes the orientation of the longitudinal axis of either of the drive roller and/or idler roller relative to the longitudinal axis of the elongated, continuously rotatable conveyor belt; a wave detector positioned adjacent the wave propagator and a known distance from the peripheral edge of the top or bottom flight of the elongated, continuously rotatable conveyor belt, and wherein the wave detector generates a signal upon receipt of a reflected wave that has been at least partially reflected from the cross-sectional thickness of the proximate peripheral edge of the top or bottom flight of the elongated, continuously rotatable conveyor belt from at least some of the propagated waves directed toward the cross-sectional thickness of the peripheral edge of the elongated, continuously rotatable conveyor belt by the energized wave propagator, and wherein the signal generated by the wave detector is representative of the distance between the peripheral edge of the elongated, continuously rotatable conveyor belt and the wave detector, and a controller coupled in signal receiving relation relative to the wave detector, and which is further controllably coupled with the linear actuator, and the wave propagator, and wherein the elongated, continuously rotatable conveyor belt is moveable along a predetermined course of travel between the drive roller, and the at least one idler roller, and wherein the controller, upon receiving the signal from the wave detector that the cross-sectional thickness of the proximate peripheral edge of the top or bottom flight of the elongated, continuously rotatable conveyor belt is moving out of a safe variance of the predetermined course of travel, operably actuates the linear actuator so as to exert a predetermined amount of force on the drive roller and/or idler roller, and wherein the force exerted on the drive and/or idler roller affects a change in the positional orientation of the longitudinal axis of the drive roller and/or the idler roller relative to the longitudinal axis of the elongated, continuously rotatable conveyor belt and causes a resulting motion of the elongated, continuously rotatable conveyor belt in a direction back into the safe variance of the predetermined path of travel.

A further aspect of the present invention relates to an apparatus wherein the waves are mechanical waves.

A further aspect of the present invention relates to an apparatus wherein the wave propagator emits waves in a manner where the waves are transmitted in a direction toward, and are reflected, at least in part from, the cross-sectional thickness of one of the proximate peripheral edges of the elongated, continuously rotatable conveyor belt, and wherein at least some of the reflected waves are used to generate the signal generated by the wave detector.

A further aspect of the present invention relates to an apparatus wherein the drive roller, and the idler roller each have opposite ends, and wherein the linear actuator is mounted in force transmitting relation relative to one or both ends of the drive roller and/or the idler roller, and wherein the force applied by the linear actuator to one end, or both ends, of either, or both, the drive roller and/or the idler roller moves the longitudinal axis thereof in a given plane which has a predetermined angular orientation relative to the predetermined course of travel of the conveyor belt.

A further aspect of the present invention relates to an apparatus comprising a load cell which is coupled in force sensing relation relative to the linear actuator, and wherein the load cell is coupled in signal transmitting relation relative to the controller, and wherein the signal which is supplied to the controller by the load cell indicates to the controller the amount of force being exerted by the linear actuator on the drive roller, and/or the idler roll, and the elongated, continuously rotatable conveyor belt.

A further aspect of the present invention relates to an apparatus wherein the waves are continuously generated when the conveyor belt is in operation.

A further aspect of the present invention relates to an apparatus wherein the waves are periodically generated when the conveyor belt is in operation.

These and other aspects of the present invention will be discussed in greater detail hereinafter.

BRIEF DESCRIPTION OF THE DRAWINGS

Preferred embodiments of the invention are described, below, with reference to the following accompanying drawings.

DETAILED DESCRIPTION OF THE PREFERRED EMBODIMENT

This disclosure of the invention is submitted in furtherance of the constitutional purposes of the U.S. Patent Laws "to promote the progress of science and the useful arts" [Art. I, Sec. 8].

Figure 1:
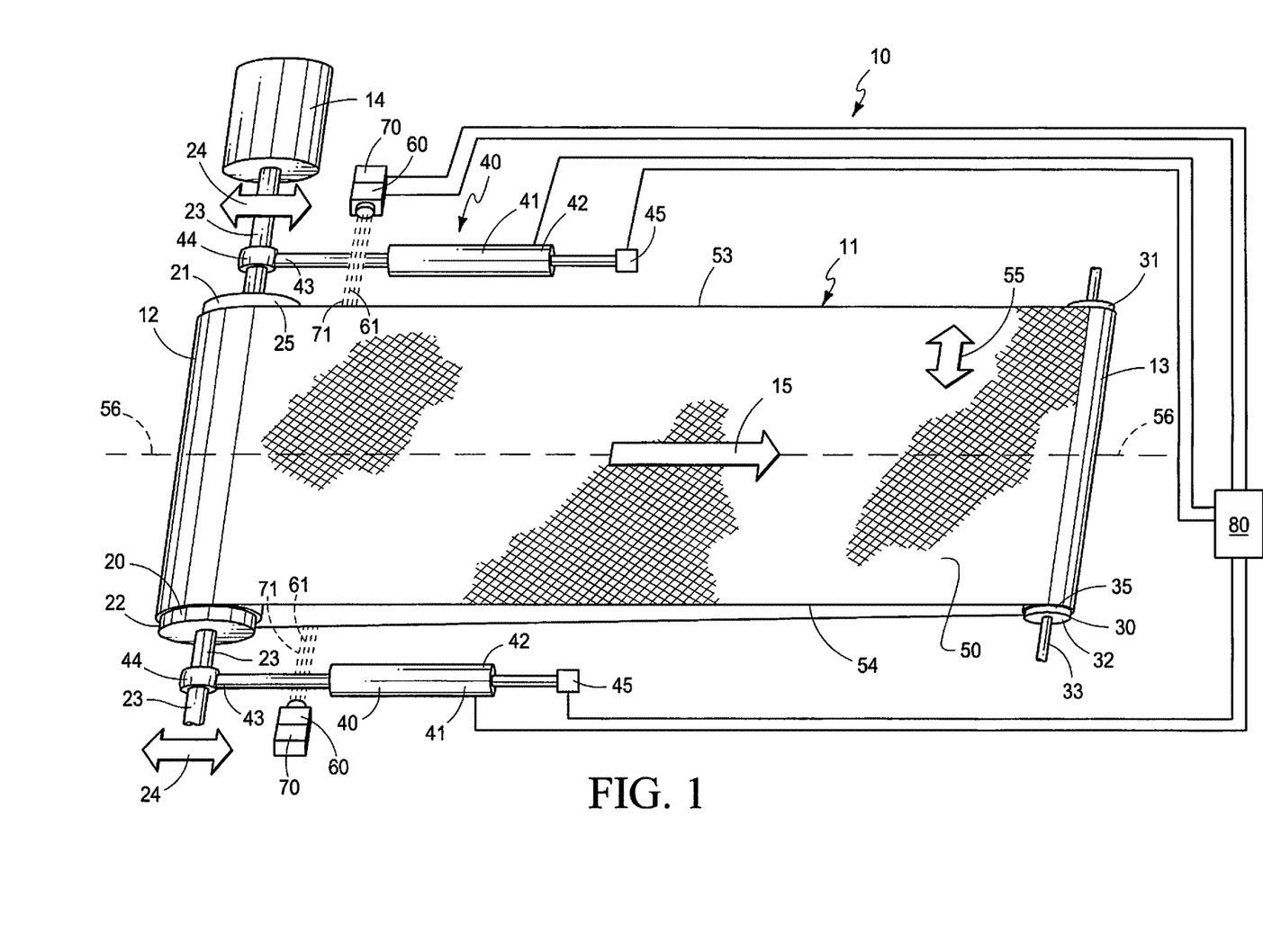
FIG. 1 is a greatly simplified plan view of a first form of the present invention.

An apparatus for adjustably positioning an object of interest is generally indicated by the number 10, in FIG. 1, and following. As seen in the drawings, the present apparatus 10 is peculiarly designed for adjustingly positioning an object of interest, here indicated by the numeral 11, and which is depicted as a continuous conveyor belt assembly for transporting various individual objects (not shown). The continuous conveyor belt assembly 11 has an intake end 12, and an opposite discharge or exhaust, end which is generally indicated by the numeral 13. As seen in FIG. 1, the object of interest or continuous conveyor belt assembly 11 is rendered operable for movement by a selectively energizable motor 14 of traditional design. Typically, continuous conveyor belt assemblies 11 are energized by electric motors. However motors 14 driven by other power sources would work with an equal degree of success. As seen in FIG. 1, the motor 14 is operable to drive the continuous conveyor belt assembly 11 so that the continuous conveyor belt assembly 11 moves along a predetermined course of travel which is generally indicated by the arrow labeled 15. The predetermined course of travel 15 extends from the intake end 12, to the exhaust end 13.

The continuous conveyor belt assembly 11 or object of interest 11 includes a drive roller 20. The drive roller 20 has opposite first and second ends 21 and 22, respectively, and further is rotatable about a centrally disposed axle 23. The axle 23 is held in a given orientation and is rendered rotatable by means of bearings (not shown) which are held in bearing blocks. (not shown). It should be understood that at least one, or perhaps both, of the bearing blocks supporting the axle 23 are reciprocally moveable along a given linear path of movement which is generally indicated by the numeral 24. (FIG. 1) The drive roller 20 has an exterior facing surface 25 which frictionally engages an overlying flexible conveyor belt 50 which will be discussed in the paragraphs which follow.

Figure 4:
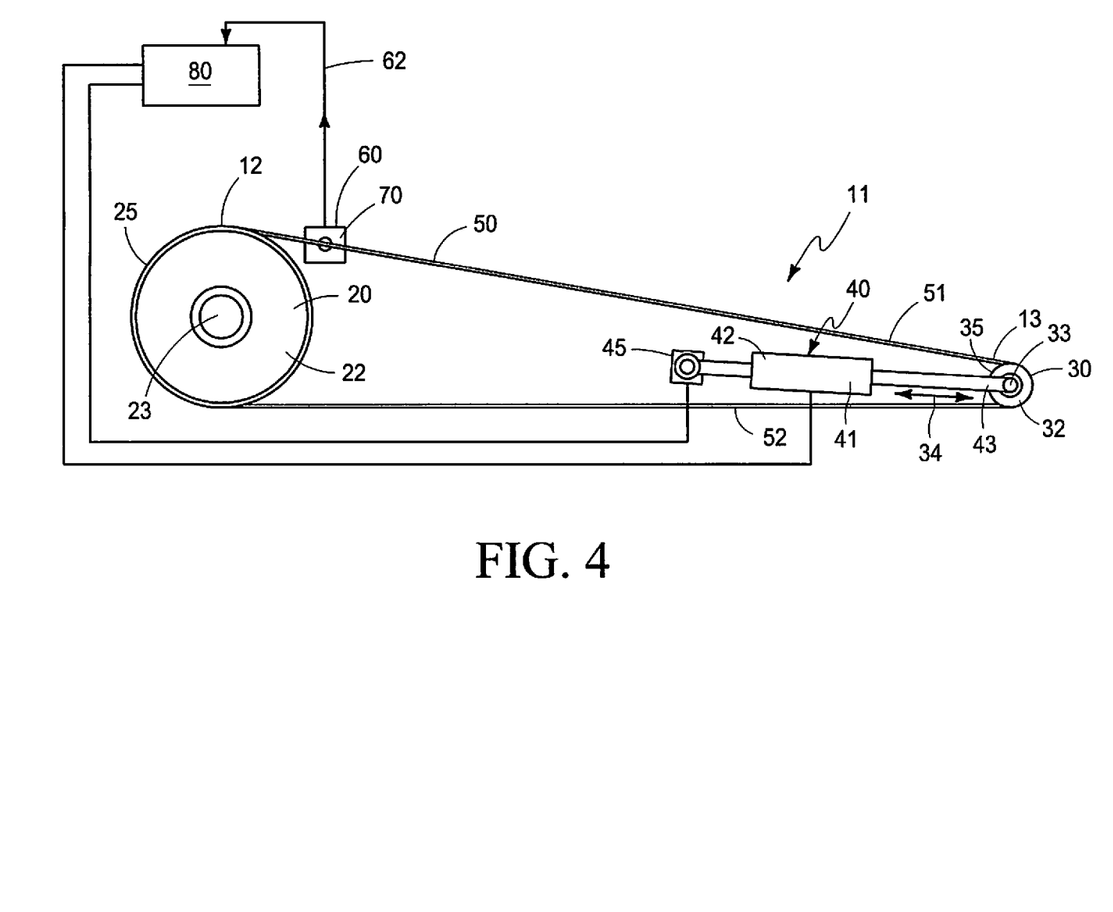
FIG. 4 is a greatly simplified, orthographic side view, of a second form of the present invention showing the linear actuator communicating with the idler roller.

The continuous conveyor belt assembly 11 further includes an idler roller 30 which is located in a predetermined, spaced relationship relative to the drive roller 20. The idler roller 30 is of traditional design, and has opposite first and second ends 31 and 32, respectively, and an axle 33 which rotatably supports the idler roller 30 in a predetermined, substantially parallel, spaced relationship relative to the drive roller 20. Again, the first and second ends 31 and 32 of the idler roller 30 are mounted within bearings and bearing blocks (not shown). The bearing blocks of the idler roller 30, in one form of the invention, can be rendered moveable along a given path of movement 34, as seen in FIG. 4. Again, the idler roller 30 has an exterior facing surface 35 which frictionally and operably engages an overlying and flexible conveyor belt 50 which will be discussed in the paragraphs which follow.

Figure 2:
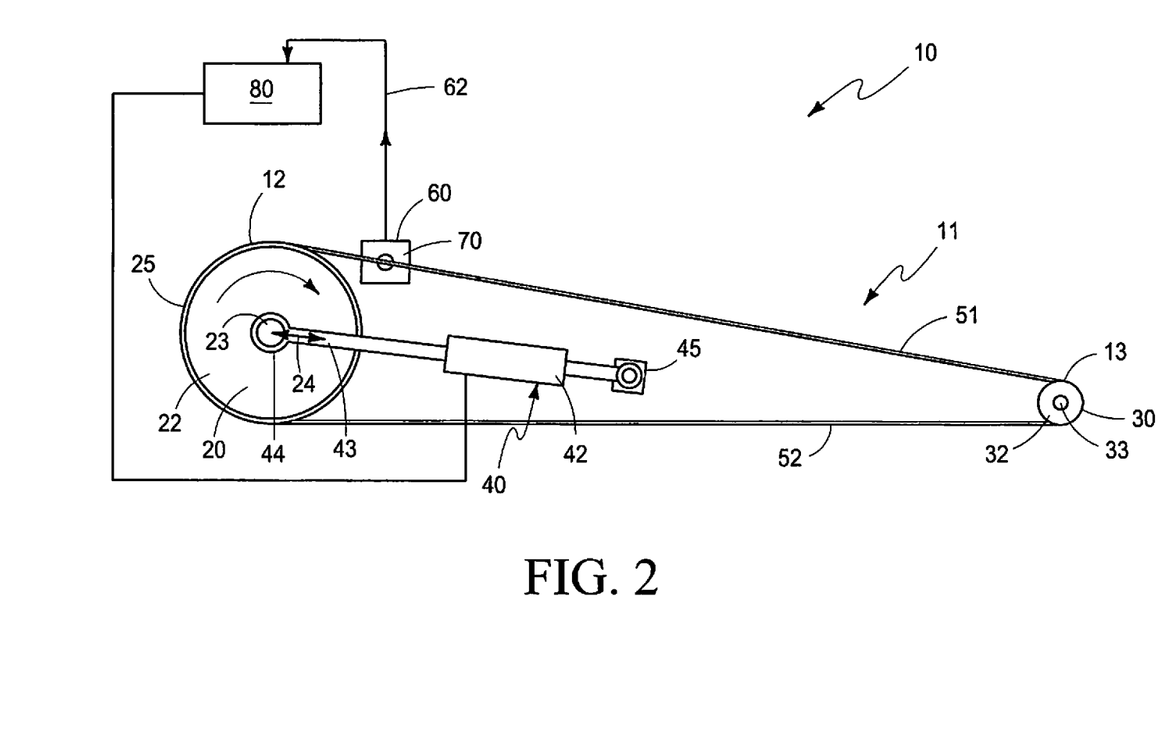
FIG. 2 is a greatly simplified, orthographic side view of a first form of the present invention.
Figure 3:
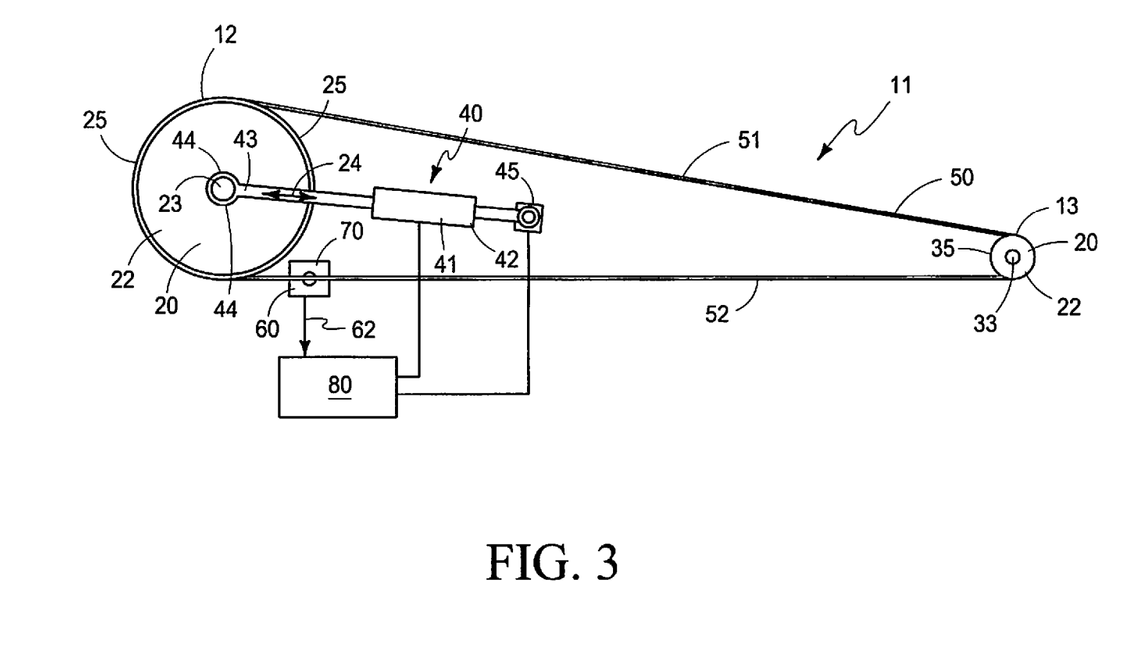
FIG. 3 is a greatly simplified, orthographic side view of the first form of the present invention showing the wave propagator and wave detector oriented toward the bottom flight of the conveyor belt.

The present invention 10 includes an adjustment device which is mounted in force transmitting relation relative to the object of interest 11, here illustrated as the continuous conveyor belt assembly 11, and which, when actuated, imparts force to the object of interest 11 to maintain the object of interest 11 along the predetermined course of travel 15. In this regard, the adjustment device 40 is herein illustrated as a linear actuator 41 which could be in the form of a screw-thread type, or a fluid actuated cylinder of traditional design. In this regard, the linear actuator 41 has a first end 42, and an opposite second end 43. The second end 43 has an axle engagement member 44 which matingly, and forcibly cooperates with the first end 21, of the drive roller 20, or the first end 31, of the idler roller 30, depending upon the form of the invention being considered. While the invention 10 is illustrated in FIGS. 2, 3 and 4 as having an adjustment device 40 on only one side of the continuous conveyor assembly 11, it will be seen by a study of FIG. 1 that the present invention 10 could be arranged, so as to have two adjustment devices 40, which are individually located on opposite sides of the continuous conveyor assembly 11, so as to move the drive roller 20, or the idler roller 30, or both, along their linear paths movement 24 or 34, respectively, in order to change their relative spatial orientation with respect to the opposite roller 20, 30. By changing the relative orientation of the respective drive roller 20 or idler roller 30 in small increments, the continuous conveyor belt 50, as will be discussed, below, can be operably maintained along the predetermined course of travel 15 and also at an optimal tension that minimizes belt wear and belt vibration. This further prevents the continuous conveyor belt 50, as will be described, from drifting to either lateral side or peripheral edge 53, 54, or in the direction of either the opposite, first or second ends 21, 22, 31, 32 of the drive roller 20, or idler roller 30, respectively. The adjustment device 40 further includes a load cell 45 which is operable to determine the amount of force that the linear actuator 41 is exerting on, or against, the respective axles 23, 33. The load cell 45 generates an important electrical signal which contains information relating to the amount of force being exerted on the continuous conveyor belt 50 by the rollers 20, 30 so that adjustments can be made within a range of force values which are appropriate for the type of continuous conveyor belt 50 which is being utilized in connection with the present invention 10.

Figure 5:
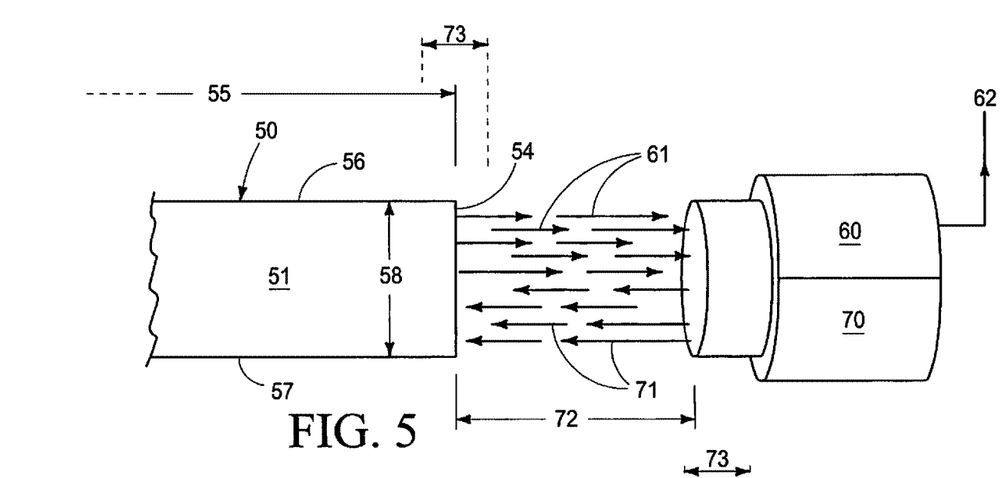
FIG. 5 is an enlarged, partial cutaway view, of the wave propagator and wave detector emitting and receiving waves from a peripheral edge of the top flight of the conveyor belt, with the peripheral edge of the conveyor belt within the safe variance.
Figure 6:
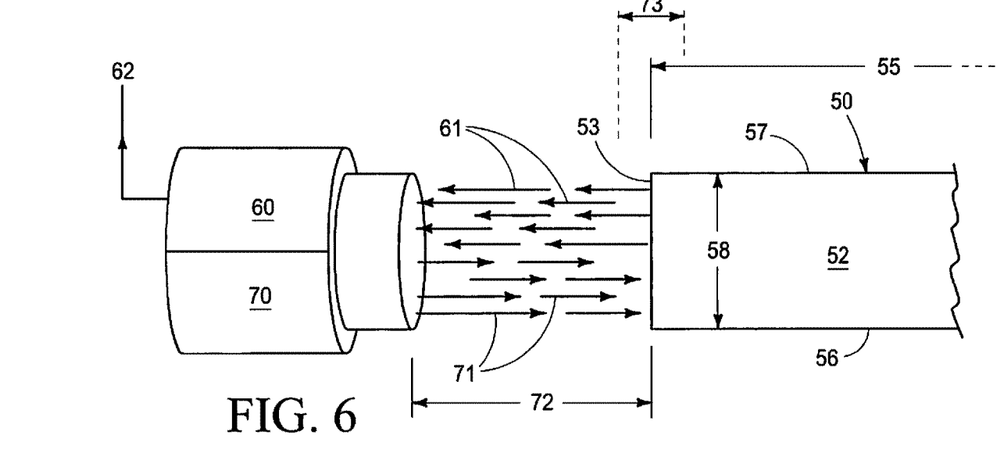
FIG. 6 is an enlarged, partial cutaway view, similar to that of FIG. 5 showing the wave propagator and wave detector emitting and receiving waves from a peripheral edge of the bottom flight of the conveyor belt, with the peripheral edge of the conveyor belt within the safe variance.

The object of interest, and which is herein depicted as a continuous conveyor belt assembly 11, has a rotatable and flexible conveyor belt which is generally indicated by the numeral 50. The continuous conveyor belt 50 has an exterior product carrying surface 56 (FIG. 5) and an opposing interior facing surface 57 (FIG. 5) that is in direct physical contact with the exterior surfaces 25, 35 of the rollers 20, 30. A cross-sectional thickness 58 is defined between the exterior product carrying surface 56 and the opposing interior facing surface 57. (FIG. 5). The conveyor belt 50 is tensioned between the drive roller 20, and idler roller 30, so that the conveyor belt 50 is in continuous force receiving relation relative to the drive roller 20. The conveyor belt 50 has a top flight 51, and an opposite, bottom flight 52. The top flight 51 is operable to support an object or a product or other item of interest and which is being transported along the predetermined course of travel 15 and between the intake end 12, and the exhaust end 13. As seen by reference to FIG. 1, the continuous conveyor belt 50, and more specifically the top and bottom flights 51, 52 thereof, each has a first peripheral edge 53, and an opposite, second peripheral edge 54. The cross-sectional thickness 58 of the continuous conveyor belt 50 is visible at both peripheral edges 53, 54. (FIGS. 5, 6).

As can be seen in FIG. 1, the continuous conveyor belt 50, when rendered operational, may move along a transversely oriented path of travel which is indicated by the numeral 55, in a slowly drifting or "creeping" fashion so as to change the orientation, either toward the left of the predetermined course of travel 15, or to the right of the predetermined course of travel 15. Again, this drifting or "creeping" in the orientation of the conveyor belt 50 relative to the rollers 20, 30, may be caused by belt wear, speed of operation of the belt, or from the idler roller 30, and drive roller 20 moving into an un-parallel orientation, one relative to the other. Still further, and if employed in an optical sorting device of the type which inspects a stream of a product while it is traveling along a free-fall path of travel (not shown) after leaving the top-flight 51 of the conveyor belt 50 the drifting/ "creeping" motion of the conveyor belt 50 can cause the object or product that is intended to be inspected to travel along a somewhat unpredictable path of travel or trajectory. In this undesirable situation, the optical sorting apparatus (not shown) may malfunction because a previously identified defective or undesirable product or object might not be effectively ejected from the free-falling product stream because the attempt to eject the defective object or product takes place in the wrong location along the assumed trajectory of the free-falling object or product which is being sorted.

The present invention 10 includes a wave propagator 70 which emits waves 71 directionally therefrom. It should be understood that the emitted waves 71 may be, without limitation, mechanical waves, pressure waves, electromagnetic waves and the waves may be either visible, or invisible. The wave propagator 70 is positioned a known distance 72 from one or both peripheral edges 53, 54 of the continuous conveyor belt 50 and is oriented toward the cross-sectional thickness 58 of the continuous conveyor belt 50 so that the waves 71 emitted from the wave propagator 70 are directed toward the cross-sectional thickness 58, and at least a portion of the emitted waves 71 strike, and are thereafter reflected from, the cross-sectional thickness 58 of the continuous conveyor belt 50. In the first form of the invention 10, the wave propagator 70 is oriented toward the cross-sectional thickness 58 of the top flight 51 of the continuous belt 50 proximate the drive roller 20. In another form of the invention (FIG. 3) the wave propagator 70 is oriented toward the cross-sectional thickness 58 of the bottom flight 52 of the continuous conveyor belt 50 proximate the drive roller 20. It is also contemplated the wave propagator 70 may be positioned proximate to the idler roller 30 and oriented toward the top flight 51 or the bottom flight 52 of the continuous conveyor belt 50. (not shown).

The positioning of the wave propagator 70 proximate the drive roller 20 is advantageous because the continuous conveyor belt 50 is most positionally stable proximate the rollers 20, 30 and particularly the drive roller 20, and because the continuous conveyor belt 50 is typically unloaded (not carrying product to be sorted) at such position which reduces the likelihood that product splatter, product debris and the like may interfere with the wave propagator 70. Further, because the continuous conveyor belt 50 is in direct physical contact with the drive roller 20, as the continuous conveyor belt 50 reverses course of travel from the intake end 12 toward the exhaust end 13, the belt 50 is less likely to experience vibrations, dips or waves or be affected by product movement on the exterior product carrying surface 56. As a result, the cross-sectional thickness 58 of the peripheral edge 53, 54 is a relatively positionally stable target for the wave propagator 70 and the emitted waves 71 therefrom.

In the first form of the present invention, the wave propagator 70 emits waves 71 that are mechanical waves, and more specifically soundwaves. Because the distance 72 between the wave propagator 70 and the proximate peripheral edge 53, 54 of the continuous conveyor belt 50 is known when the continuous conveyor belt 50 is moving along the predetermined course of travel 15, and within a safe variance 73 (FIG. 5) thereof, and because of the speed of the emitted soundwaves 71 passing through an air medium (not shown) is known, the time for the emitted wave 70 to travel from the wave propagator 70 and to the cross-sectional thickness 58 of the proximate peripheral edge 53, 54 of the continuous conveyor belt 50 is calculable and therefore known.

The current invention 10 further includes a wave detector 60 that is positioned a known distance 72 from the peripheral edge 53, 54 of the continuous conveyor belt 50 preferably adjacent to the wave propagator 70, and is oriented toward the cross-sectional thickness 58 of the continuous conveyor belt 50 so as to receive reflected waves 61 that have struck, and been reflected from the cross-sectional thickness 58 of the continuous conveyor belt 50. In the first form of the invention 10, the wave propagator 70 and the wave detector 60 are integrated into a single physical component, but the wave propagator 70 and the wave detector 60 may similarly be separate physical components that are positioned proximate one another spacedly adjacent the peripheral edge 53, 54 of the continuous conveyor belt 50. In a further contemplated form of the invention 10, a wave propagator 70 and a wave detector 60 are positioned adjacent to each opposing peripheral edge 53, 54 of the continuous conveyor belt 50 so as to provide measurement redundancy and provide redundant determination of the position of the proximate peripheral edge 53, 54 of the continuous conveyor belt 50 relative to the predetermined course of travel 15. In a first form of the invention 10, the emitted waves 71 and reflected waves 61 are soundwaves, because soundwaves are less subject to interference caused by product splatter and debris and soundwaves do not require contrast which is a requisite with optical detection and electromagnetic waves. However in other forms of the invention, it is contemplated that the emitted waves 71 and reflected waves 61 may be electromagnetic waves, and/or pressure waves, and be of varying wavelengths in either or both the visible and invisible wavelength ranges.

Because the distance 72 between the wave detector 60 (and wave propagator 70) and the proximate peripheral edge 53, 54 of the continuous conveyor belt 50 is known, and because of the speed of the reflected soundwaves 61 passing through an air medium (not shown) is known, the time for the reflected wave 61 to travel from the cross-sectional thickness 58 of the peripheral edge 53, 54 of the continuous conveyor belt 50 to the wave detector 60 is calculable and therefore known. Any variation in this calculable and known time is evidence that the peripheral edge 53, 54 of the continuous conveyor belt 50 has moved laterally along the path of travel 55 toward one of the peripheral edges 53, 54 and toward one end 21, 22 of the drive roller 20 and away from the opposing end 22, 21. Such movement, if in an amount exceeding a predetermined safe variance 73 requires correction, namely an adjustment by the adjustment device 40 so as to alter the orientation of the drive roller 20 and/or idler roller 30, or both, so as to move the continuous conveyor belt 50 back to a position within the known safe variance 73 of the predetermined course of travel 15.

When reflected waves 61 are received/detected by the wave detector 60, the wave detector 60 generates a signal 62 which is correlated to the actual distance between the wave detector 60 and the proximate peripheral edge 53, 54 of the continuous conveyor belt 50. The generated signal 62 is electronically communicated to a controller 80.

The apparatus 10 further includes a controller 80 which is coupled in signal receiving relation relative to the wave detector 60, and which is further disposed in controlling relation relative to the wave propagator 70 and the adjustment device 40. The controller 80 selectively actuates the wave propagator 70 to cause waves 71 to be emitted therefrom (emitted waves 71) which are directed toward the cross-sectional thickness 58 of the proximate peripheral edge 53, 54 of the conveyor belt 50, and the controller 80 identifies an instant in time (not shown) when the waves 71 are emitted from the wave propagator 70. As noted previously, the controller 80 is also coupled in signal receiving relation to the wave detector 60 to identify an instant in time (not shown) when reflected waves 61 that have struck the cross-sectional thickness 58 of the peripheral edge 53, 54 and been reflected therefrom are detected by the wave detector 60.

The controller 80, upon receipt of the signal 62 from the wave detector 60 determines a time between emission of the emitted wave 71 by the wave propagator 70 and receipt of a reflected wave 61 by the wave detector 60. Having a determined time, and knowing the speed of the waves 71, 61 in an air medium (not shown) allows the controller 80 to determine the actual distance between the wave propagator 70 (and wave detector 60) to the peripheral edge 53, 54 of the conveyor belt 50. The calculated actual distance is then compared to the known safe variance 73 and any actual distance that is not within the known safe variance 73 is a displaced position that requires positional correction. The safe variance 73 is generally between approximately plus/minus (+/−) 4.5 mm of the predetermined course of travel 15.

The controller 80 selectively actuates the adjustment device 40, based upon calculations from the received signal 62, so as to maintain the movement of the object of interest 11 along the predetermined course of travel 15. The controller 80 is operably coupled to each of the linear actuators 41, load cells 45, wave detector(s) 60, and wave propagator(s) 70 so as to selectively actuate the respective components in a coordinated fashion, and thus continually monitor the positions of the first and/or second peripheral edges 53, 54 of the top or bottom flights 51, 52, of the conveyor belt 50. The controller 80 generates and communicates signals to the various components based upon the received signal 62, so that the linear actuator(s) 41 exerts sufficient force on either of the respective drive roller 20, or idler roller 30. This exerted force encourages the movement of these assemblies, and thus a corresponding and resulting corrective movement of the conveyor belt 50 along the lateral path of travel 55. Thus at least one of the linear actuators 41 is operable to cause a subsequent movement of the continuous conveyor belt 50 from a displaced position relative to the predetermined course of travel 15, back into alignment with the predetermined course of travel 15. This adjustment of the conveyor belt 50 ensures that objects being transported by the conveyor belt 50, and which are released to move along a free-fall path of travel or trajectory move along a predictable and consistent free-fall path of travel.

The controller 80 also maintains correct overall tension on the conveyor belt 50 while making adjustments via the linear actuators 41 using signals received from the load cells 45.

Operation

The operation of the described embodiment of the present invention 10 is believed to be readily apparent and is briefly summarized at this point.

In its broadest aspect, the present invention relates to an apparatus 10 for adjustably positioning an object of interest 11, and where the object of interest 11, such as a conveyor belt 50, is rendered operable to move along a predetermined course of travel 15. The invention 10 further includes a wave propagator 70 and a wave detector 60 which are both mounted in spaced relation relative to, and a known distance 72 from, the object of interest 11. The wave detector 60 forms a signal 62 of a feature which is being monitored. The invention further includes an adjustment device 40 which is mounted in force transmitting relation relative to the object of interest 11. The adjustment device 40, when actuated, imparts force to the object of interest 11 to maintain the object of interest along the predetermined course of travel 15. The invention further includes a controller 80, which is coupled in signal receiving relation relative to the wave detector 60, and which is further disposed in controlling relation relative to the wave propagator 70 and the adjustment device 40. The controller 80 selectively actuates the adjustment device 40 based upon the received signal 62 so as to maintain the object of interest 11 along the predetermined course of travel 15.

As noted above, the object of interest 11 comprises an elongated continuous conveyor belt 50 which has a longitudinal axis 56, top and bottom flights 51 and 52, respectively, and which is further tensioned between a drive roller 20, and an idler roller 30. The drive roller 20 and the idler roller 30 are each oriented in a substantially perpendicular relationship relative to the longitudinal axis 56 of the continuous conveyor belt 50. The drive roller 20 and the idler roller 30 are each further selectively moveably adjustable relative to the longitudinal axis 56 of the continuous conveyor belt 50 so as to maintain the conveyor belt 50 along the predetermined course of travel 15.

The present invention 10 further includes a wave propagator 70 which emits waves 71 that are transmitted toward and reflected from the cross-sectional thickness 58 of a peripheral edge 53, 54 of the conveyor belt 50 and thereafter received by the wave detector 60. In the arrangement as seen in the drawings, the emitted waves 71 can be, but are not limited to, mechanical waves (such as soundwaves), or pressure waves or electromagnetic waves. In one form of the invention 10, as seen in the drawings, the wave propagator 70 emits mechanical waves 71 in a manner where the mechanical waves 71 are transmitted in a direction toward the cross-sectional thickness 58 of the peripheral edge 53, 54 of the continuous belt 50, and at least a portion of the mechanical waves 71 are reflected, at least in part from, the proximate peripheral edge 53, 54 (FIG. 5). In this arrangement, at least some of the reflected mechanical waves 61 form the signal 62, which is generated by the wave detector 60 and subsequently transmitted to the controller 80.

In the present invention 10, the adjustment device 40 further comprises a linear actuator 41, which, when rendered operational, is continuously adjustable by the control of the controller 80 so as to exert a variable and predetermined amount of force on either the drive roller 20, and/or the idler roller 30, so as to change the relative positions thereof, and thus effect the movement of the continuous conveyor belt 50 along the lateral path of travel 55 which is generally transverse to the predetermined course of travel 15. In the arrangement as seen in the drawings, the drive roller 20, and the idler roller 30 each have opposite ends 21, 22, 31, 32. Still further the linear actuator 41 is mounted in force transmitting relation relative to one end, or both ends, of either of the drive roller 20, and/or the idler roller 30. In the arrangement as seen in FIG. 1, the apparatus 10 further comprises a second linear actuator 41, and which is mounted on the opposite end of either the drive roller 20 or idler roller 30. Each of the linear actuators 41 are operably coupled to the controller 80. In the arrangement as seen in the drawings, and by example, the feature which is monitored by the wave detector 60 is the position of the peripheral edge 53, 54 of the top or bottom flight 51 or 52, of the continuous conveyor belt 51.

The present invention 10 further includes a load cell 45 which is coupled in force sensing relation relative to the linear actuator 41. The load cell 45 is further coupled in signal transmitting relation relative to the controller 80. A signal (not shown) which is supplied to the controller 80, by the load cell 45, indicates to the controller 80 the amount of force being exerted by the linear actuator 41, on the drive roller 20 and/or idler roller 30, and the elongated continuous conveyor belt 50.

The controller 80 further provides overall tension management for the conveyor belt 50 to maintain optimal tension on the conveyor belt 50 between the drive roller 20 and the idler roller 30. In providing overall tension management of the conveyor belt 50, the controller 80 takes into account the position of the peripheral edges 53, 54 of the conveyor belt 50 relative to the predetermined course of travel 15 and the safe variance 73, and also takes into account and measures and monitors the tension of the conveyor belt 50 between the drive roller 20 and the idler roller 30 using signals provided by the load cells 45 so as to steer the conveyor belt 50 along the lateral path of travel 50 while maintaining an optimal overall tension in the conveyor belt 50 that provides for optimal belt wear while avoiding "vibrations", "hops" and "jumps" while maintaining the positional stability of the conveyor belt 50 proximate to the wave projector 70 and the wave detector 60.

For purposes of example only, if the conveyor belt 50 moves in one lateral direction along the path of travel 55 to a degree that the conveyor belt 50 is "outside" the safe variance 73, according to the signals 62 from the wave detector 60, the controller 80 will actuate at least one linear actuator 41 to steer the conveyor belt 50 back into the safe variance 73. However, if the load cells 45 have provided signals to the controller 80 indicating that the belt 50 is at, or near, it's a maximum optimal tension (not shown), then rather than extending/elongating one linear actuator 41 to steer the belt 50 back into the safe variance 73, the controller 80 may instead retract/contract a different linear actuator 41 so as to cause the belt 50 to steer back into the predetermined course of travel 15 and safe variance 73 while maintaining, and not exceeding, the optimal tension of the belt 50.

In operation the emitted waves 61 may be, in one form of the invention, continuously generated when the elongated conveyor belt 50 is in operation. In another possible form of the invention, emitted waves 61 may be only periodically generated when the elongated conveyor belt 50 is in operation. Those skilled in the art will recognize that the feature being monitored may comprise other items or features of the belt such as regularly spaced apart protrusions or other physical characteristics which may be placed in a given location on either the top or bottom flight 51 or 52; or some other physically discernible feature of the continuous conveyor belt 50, and which can be detected with reflected waves.

Therefore, it will be seen that the present invention 10 provides a convenient means whereby an object of interest 11, such as a conveyor belt 50, may be monitored, during operation, and then selectively adjusted in its orientation relative to a drive roller 20, and/or an idler roller 30, so as to ensure an appropriate operation of the object of interest 11 during operation.

In compliance with the statute, the invention has been described in language more or less specific as to structural and methodical features. It is to be understood, however, that the invention 10 is not limited to the specific features shown and described, since the means herein disclosed comprise preferred forms of putting the invention into effect. The invention is, therefore, claimed in any of its forms or modifications within the proper scope of the appended claims appropriately interpreted in accordance with the Doctrine of Equivalence.

We claim:

1. An apparatus for adjustably positioning an elongated continuously rotatable conveyor belt, comprising:
    the elongated continuously rotatable conveyor belt has opposite first and second ends, a top flight for supporting a product, and an opposite bottom flight, and wherein the elongated, continuously rotatable conveyor belt has two spaced apart and opposing parallel peripheral edges and the elongated continuously rotatable conveyor belt has a cross-sectional thickness accessible at the two spaced apart and opposing parallel peripheral edges and the cross-sectional thickness is defined between an exterior product carrying surface and an opposing interior facing surface, and the elongated continuously rotatable conveyor belt is further tensioned between a drive roller, and at least one idler roller, and further has a longitudinal axis which extends between the first and second ends thereof, and wherein the drive roller, and the at least one idler roller, each have a longitudinal axis which is located in a substantially transverse orientation relative to the longitudinal axis of the elongated, continuously rotatable conveyor belt;
    an ultra-sonic wave propagator positioned a known and laterally spaced distance from one peripheral edge of the top or bottom flight, and horizontally aligned with the top or bottom flight of the elongated, continuously rotatable conveyor belt and which, when energized, propagates ultra-sonic waves which are directed at the cross-sectional thickness of the adjacent one peripheral edge of the top or bottom flight of the elongated, continuously rotatable conveyor belt, and the propagated ultra-sonic waves are directed generally parallel to both the exterior product carrying surface and the opposing interior facing surface of the continuously rotatable conveyor belt and generally transverse to the longitudinal axis of the continuously rotatable conveyor belt;
    a linear actuator mounted in force transmitting relation relative to the drive roller and/or idler roller, and wherein a force generated by the linear actuator on either of the drive roller and/or idler roller changes the orientation of the longitudinal axis of either of the drive roller and/or idler roller relative to the longitudinal axis of the elongated, continuously rotatable conveyor belt;
    an ultra-sonic wave detector positioned a known and laterally spaced distance from one peripheral edge of the top or bottom flight, and horizontally aligned with the top or bottom flight of the elongated, continuously rotatable conveyor belt, and on the same side of the elongated, continuously rotatable conveyor belt as the ultra-sonic wave propagator, and wherein the ultra-sonic wave detector generates a signal upon receipt of a reflected ultra-sonic wave that has been at least partially reflected from the cross-sectional thickness of the peripheral edge of the top or bottom flight of the elongated, continuously rotatable conveyor belt from at least some of the propagated ultra-sonic waves directed at the cross-sectional thickness of the peripheral edge of the elongated, continuously rotatable conveyor belt by the energized ultra-sonic wave propagator, and wherein the signal generated by the ultra-sonic wave detector is representative of a total distance between the adjacent peripheral edge of the elongated, continuously rotatable conveyor belt and the ultra-sonic wave propagator and the distance between the adjacent peripheral edge of the elongated, continuously rotatable conveyor belt and the ultra-sonic wave detector; and
    a controller coupled in signal receiving relation relative to the ultra-sonic wave detector, and which is further controllably coupled with each of the linear actuator, and the ultra-sonic wave propagator, and wherein the elongated, continuously rotatable conveyor belt is moveable along a predetermined path of travel between the drive roller, and the at least one idler roller, and wherein the controller, upon receiving a signal from the ultra-sonic wave detector that the adjacent peripheral edge of the elongated, continuously rotatable conveyor belt has moved closer to the ultra-sonic wave detector or away from the ultra-sonic wave detector and away from the predetermined path of travel, operably actuates the linear actuator so as to exert a predetermined amount of force on either the drive roller and/or at least one idler roller, and wherein the force exerted on either the drive and/or at least one idler roller affects a change in the positional orientation of the longitudinal axis of the drive roller and/or the at least one idler roller relative to the longitudinal axis of the elongated, continuously rotatable conveyor belt and causes a resulting motion of the elongated, continuously rotatable conveyor belt in a direction back to the predetermined path of travel.

2. The apparatus as claimed in claim 1, and further comprising a load cell which is coupled in force sensing relation relative to the linear actuator, and wherein the load cell is coupled in signal transmitting relation relative to the controller, and wherein the signal which is supplied to the controller by the load cell indicates to the controller the amount of force being exerted by the linear actuator on the drive roller, and/or the idler roll, and the elongated, continuously rotatable conveyor belt.

3. The apparatus as claimed in claim 1, and wherein the ultra-sonic waves are continuously generated when the elongated, continuously rotatable conveyor belt is in operation.

4. The apparatus as claimed in claim 1, and wherein the ultra-sonic waves are periodically generated when the elongated, continuously rotatable conveyor belt is in operation.

* * * * *